United States Patent [19]

Watatani et al.

[11] 3,928,720

[45] Dec. 23, 1975

[54] SYNCHRONIZING SIGNAL REGENERATOR

[75] Inventors: Yoshizumi Watatani, Machida; Katsuo Mohri, Yokohama; Masaaki Fukuda, Kodaira; Tatsuo Kayano, Hachioji; Takehiko Yoshino, Yokohama, all of Japan

[73] Assignees: Hitachi, Ltd.; Hitachi Electronics Co., Ltd.; Hoso Kyokai, all of Tokyo, Japan

[22] Filed: May 20, 1974

[21] Appl. No.: 471,822

[30] Foreign Application Priority Data

May 23, 1973 Japan .............................. 48-56823

[52] U.S. Cl..... 178/69.5 G; 178/69.5 R; 179/15 BY

[51] Int. Cl.$^2$.............................................. H04L 7/00

[58] Field of Search....... 178/69.5 G, 69.5 R, 5.8 R; 179/15 BY, 15 BS; 325/325

[56] References Cited

UNITED STATES PATENTS

| | | | |
|---|---|---|---|
| 3,462,551 | 8/1969 | Fong | 178/69.5 R |
| 3,557,308 | 1/1971 | Alexander et al. | 178/69.5 R |
| 3,573,634 | 4/1971 | Rachel | 178/69.5 R |

*Primary Examiner*—Malcolm A. Morrison
*Assistant Examiner*—Errol A. Krass
*Attorney, Agent, or Firm*—Stevens, Davis, Miller & Mosher

[57] ABSTRACT

Synchronizing signal regenerator for regenerating a plurality of synchronizing signals from a composite signal including a plurality of synchronizing signals. The composite signal comprises a first synchronizing signal formed of a pulse series having a predetermined certain repetition frequency and intermittently inserted at a predetermined period for a predetermined duration, and a second synchronizing signal synchronized with the boundaries of the pulse series of the first synchronizing signal and inserted at a repetition period equal to the width of the intermittently inserted pulse series. The synchronizing signal regenerator comprises a circuit for deriving the pulse series by detecting the first synchronizing signal, a hold circuit for producing a continuous pulse when the derived pulse series has an interval less than a predetermined length, an integrator for integrating the output signal of the hold circuit, a circuit for producing a trigger pulse when the amplitude of the integrated signal reaches a predetermined value, a circuit for detecting and regenerating the second synchronizing signal, and a step down circuit for regenerating a signal synchronized with the time interval in which the pulse series of the first synchronizing signal is inserted by frequency dividing the regenerated second synchronizing signal by using the regenerated second synchronizing signal as a clock pulse and by making the trigger pulse a clear pulse.

10 Claims, 12 Drawing Figures

SYNCHRONIZING SIGNAL REGENERATOR

BACKGROUND OF THE INVENTION

The present invention relates to a synchronizing signal regenerator for regenerating signals each synchronized with a plurality of synchronizing signals included in a composite signal comprising a video signal and a pulse code modulated audio multiplex signal transmitted in a predetermined sequence, wherein a plurality of pulse code modulated synchronizing signals required for regeneration of said video signal and audio multiplex signal are inserted in a predetermined position of said video and audio multiplex signals.

A suitable embodiment of said composite signal is a still picture broadcasting signal. Accordingly, the synchronizing signal regenerator according to the present invention is particularly suitable but not limitative for use in a receiver for the still picture broadcasting signal.

Such a still picture broadcasting system has been disclosed in application Ser. No. 361,581 filed in 1973, now U.S. Pat. No. 3,854,010 so that it will be described briefly.

In one embodiemnt of such a still picture broadcasting system, the video signal and the audio signal are alternately transmitted in a predetermined sequence. For instance, in one embodiment of such transmission signal, a video signal of 1/30 second duration and an audio signal of 1/15 second duration are transmitted alternately. The video signal in the video signal transmission period is transmitted just the same as a standard television signal and at each horizontal scanning period of $1/f_H$ ($\approx 63.5\mu s$). The video signal can represent one picture in a period of 1/30 second so that the still pictures of each different content can be transmitted at each transmission period of one video signal.

In the transmission period of an audio signal the sampled audio signal is transmitted at a repetition period of $1/f_A$ which is different from the horizontal scanning period $1/f_H$ of the video signal. Said audio signal is pulse code modulated and a plurality of such audio signals are transmitted in the time division multiplex principle. One audio signal is transmitted at each one of the sampling periods $1/f_A$.

The required synchronizing signal for the reproduction of such video signal and audio signal should be transmitted at the $1/f_H$ period at least during the transmission of the video signal and at the $1/f_A$ period during the audio signal transmission period. Besides the synchronizing signals in said two kinds of repetition periods, another synchronizing signal having a different repetition period is required. All of these synchronizing signals are formed of pulse coded signals. Such synchronizing signals must include a blanking period, PCM frame pattern signal (abridged as PFP signal), and a mode control code signal (abridged as MCC signal). The PFP signal is formed by a predetermined pattern of pulses having a same bit timing as the modulated pulse series of the audio multiplex signal. This pattern is identical with all of the synchronizing signals having different repetition periods. Accordingly, the PFP signal can be utilized for detecting the locations at which the synchronizing signals are inserted. The MCC signal provides information for synchronizing signals such as the, horizontal synchronizing signal, audio PCM frame synchronizing signal, video frame synchronizing signal, and synchronizing signals for representing the video signal transmission period and audio signal transmission period.

In the above mentioned still picture broadcasting signal, the repetition period $1/f_H$ of the synchronizing signal transmitted in the video signal transmission period and the repetition period $1/f_A$ of the synchronizing signal transmitted in the audio signal transmission period are selected to be a simple integral ratio. The bit period $t_b$ of the pulse series forming the PFP signal and the modulated pulse series of the audio multiplex signal are also selected to form an integral ratio with said $1/f_H$ and $1/f_A$ periods.

In order to receive the above mentioned still picture broadcasting signal and to display a selected picture on a picture display device and to reproduce an audio signal corresponding to said picture, it is necessary to detect pulse coded synchronizing signal formed from the PFP signal and MCC signal and to regenerate a signal synchronized with respective periods. The synchronizing signals formed of such PFP signal and MCC signal are inserted in the video signal and the audio signal at substantially the same peak level as the peak levels of such video or audio signal. Therefore, a conventional circuit to be used in separation of the synchronizing signal from a conventional standard television signal such as a slice circuit based on an amplitude separation principle can not be used for detecting such synchronizing signals. Accordingly, for the regeneration of such synchronizing signals, a synchronizing signal regenerator having a particular synchronizing signal detecting circuit is required.

Furthermore, for detection and regeneration of a plurality of synchronizing signals, detecting circuits and synchronizing signal regenerators in a number corresponding to the number of the different synchronizing signals are to be provided.

SUMMARY OF THE INVENTION

The present invention has for its object to realize a novel and effective synchronizing signal regenerator suitably used in a receiver for receiving a still picture broadcasting signal.

Another object of the present invention is to realize a synchronizing signal regenerator suitable for regenerating synchronizing signals inserted in a still picture braodcasting signal.

Another object of the present invention is to realize a synchronizing signal regenerator able to regenerate synchronizing signals in a stable manner even if the signal to noise ratio in the input signal is deteriorated.

A further object of the present invention is to realize a synchronizing signal regenerator for regenerating the synchronizing signal exactly even if the detection of synchronizing signals inserted in the input signal includes a partial error.

A still further object of the present invention is to realize a synchronizing signal regenerator being able to regenerate all of the plurality of synchronizing signals accurately inserted in the signal at different repetition frequencies or phases.

According to one aspect of the present invention, the synchronizing signal regenerator for regenerating signals synchronized with synchronizing signals formed of a pulse series of a predetermined certain repetition frequency and inserted in a predetermined period in a composite signal by detecting said synchronizing signal, comprises a means for deriving said pulse series by detection thereof, a hold circuit for sending a wide width pulse at the output during a period in which the detected pulse series are in succession at a time interval less than a predetermined time, an integrator for integrating the output of said hold circuit, a means for procucing a trigger pulse when the amplitude of the output signal of said integrator assumes a value higher than a predetermined value, and a means for producing a pulse signal synchronized with said trigger pulse.

DESCRIPTION OF THE PREFERRED EMBODIMENT

Before making a detailed explanation of the embodiment of the present invention, one example of the composite signal suitable to be received by a receiver in which the synchronizing signal regenerator according to the present invention is used will be explained by referring to FIGS. 1 and 2.

Figure 1:
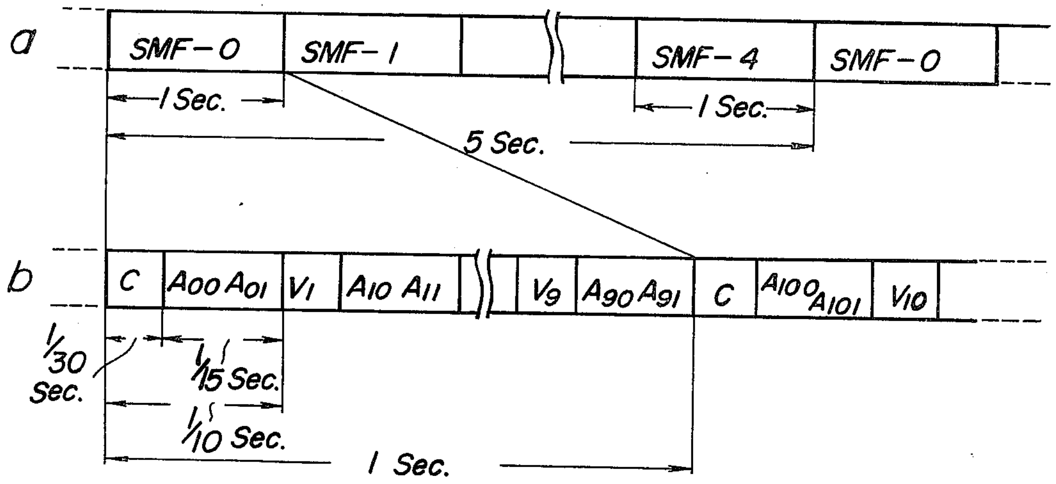
FIG. 1 and FIG. 2 are signal waveform diagrams showing one embodiment of a still picture broadcasting signal.

A still picture broadcasting signal is as shown in FIG. 1 and it generally has a 5 second repetition period. In this 5 second repetition period, five submaster frames SMF-O, SMF-1, . . . , SMF-4 are inserted successively. Each submaster frame has a duration of one second period. After the lapse of 5 seconds, a same submaster frame will be transmitted again. One submaster frame SMF consists of 30 television frames each having 1/30 second duration. Among the above 30 television frames, 9 television frames are used as a video frame V for inserting video signals. The video signal can represent one picture at each television frame. Accordingly, altogether 5×9=45 kinds of pictures can be transmitted by inserting video signals representing different pictures to each of such video frame V. Another 20 frames are used as audio frame A for inserting an audio signal. The audio signal A is allocated for successive two television frames. The former half is termed as the audio first frame and the latter half is termed as the audio second frame. In the audio frame A, audio signals for a plurality of channels are inserted in a pulse code modulated and in a time division multiplex system. The rest of one television frame is used as a control frame C for inserting the control signals. In the still picture broadcasting system, the above mentioned plurality of video and audio signals are combined to represent one program. The combined video and audio signals are reproduced in a desired sequence or in a predetermined sequence. The control signals inserted in the control frame C are the signals for designating such combination of the video and audio signals and the sequence of reproduction. In the above mentioned submaster from SMF, the control frame C is placed at the top of the sequence.

Figure 2:
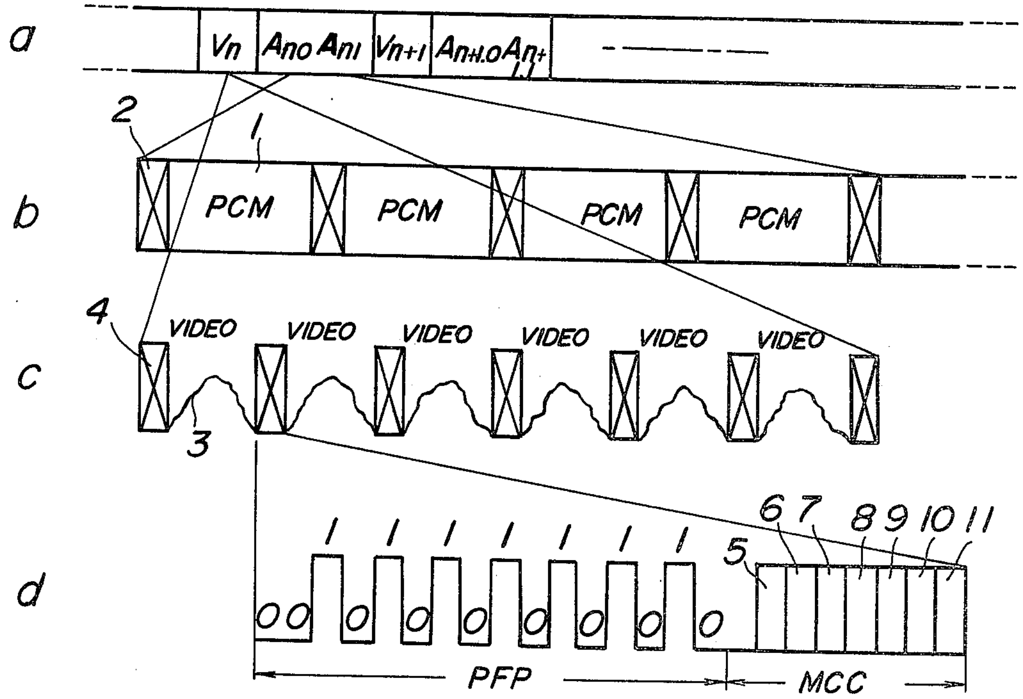

FIG. 2 shows a more detailed signal waveform diagram showing the signals inserted in such video frame V and audio frame A. In the audio frame A as shown in FIG. 2b, the pulse code modulated audio multiplex signal 1 and pulse code modulated synchronizing signal 2 are inserted. This audio multiplex signal 1 is transmitted at a repetition period of $1/f_A$ ($f_A \approx$ 10.5 KHz) equal to the sampling period, and which will be termed as the audio PCM frame period hereinafter. Accordingly, the synchronizing signal 2 for the reproduction of the audio signal is also inserted at a repetition period of $1/f_A$. In the video frame V, a video signal 3 having the same form as an NTSC system and a synchronizing signal 4 which is the same as the synchronizing signal 2 are inserted as shown in FIG. 2c. This synchronizing signal 4 is inserted at each horizontal period of $1/f_H$ ($f_H$=15.734 KHz). Accordingly, the relation between the repetition frequencies of these synchronizing signals 2 and 4 is in the following:

$$f_A/f_H = ⅔$$

The positions at which said both synchronizing signals 2 and 4 are inserted, namely the phases of said both synchronizing signals 2 and 4 coincide at a greatest common measure frequency of about 5 KHz. The synchronizing signals 2 and 4 include the PCM frame pattern signal, which hereinafter is referred to as the PFP signal, and the mode control code signal, which hereinafter is referred to as the MCC signal.

The PFP signal is a pulse series synchronized with the modulated pulse series of the audio multiplex signal which is a fixed pulse pattern of 16 bits as 0010101010101010. By using this fixed pulse pattern, a bit signal ($f_b$=6.5454 MHz) for taking timing of the above mentioned pulse code modulated signal (PCM signal) is regenerated. This PFP signal is not only synchronized with the pulse series of the audio PCM signal but it constitutes an identification signal to be used for the detection a of synchronizing signal which might include this PFP signal. The MCC signal represents a repetition period of various synchronizing signals and it can be utilized as the synchronizing signal and is formed from 8 bit pulses. In the 8 bit pulses, pulses 5–11 are included for representing 7 kinds of synchronizing signals. More particularly, the pulse 5 represents the horizontal synchronizing signal having a repetition frequency of 15.734 KHz, the pulse 6 represents the audio PCM frame synchronizing signal of a repetition frequency 10.5 KHz, the pulse 7 represents the frame synchronizing signal of repetition frequency 30 Hz, the pulse 8 represents the synchronizing signal indicating a position of the control frame, the pulses 9 and 10 represent synchronizing signals for showing audio first and second frame positions, and the pulse 11 represents the synchronizing signal for showing a position of the video frame, respectively. At positions of these pulses 5–11 representing synchronizing signals, the synchronizing signal is inserted when the pulse has value "1" and the synchronizing signal is not inserted when the pulse has value "0". For example, with respect to the MCC signal inserted in the video frame, the synchronizing signal consisting of the PFP signal and the MCC signal is inserted at a repetition period of the horizontal synchronizing signal so that pulse 5 of the MCC signal occurring in this period assumes always value "1". Furthermore, the pulse 11 for representing the position of the video frame also assume the value "1". Since the horizontal synchronizing signal and the audio PCM frame synchronizing signal coincide in their phase at the frequency of the greatest common measure frequency of the both repetition frequencies the pulse 6 of the MCC signal at a position at which the both phases coincide assumes value "1" even during the video frame period.

Figure 3:
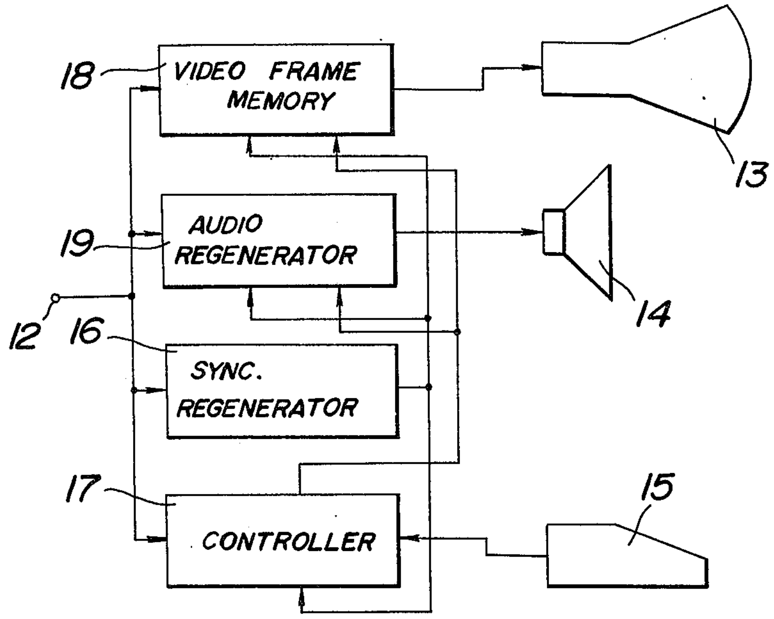
FIG. 3 is a block diagram showing an outline of a still picture broadcasting receiver.

The still picture broadcasting signal shown in FIGS. 1 and 2 is received by a receiver shown in FIG. 3.

FIG. 3 shows a block diagram showing the outline of one embodiment of a still picture broadcasting signal receiver. Referring to FIG. 3, the still picture signal is supplied to an input terminal 12. Synchronizing signal regenerator 16 detects various synchronizing signals from the supplied still picture broadcasting signal and regenerates the same. The various synchronizing signals thus reproduced and required for the reproduction of video and audio signals are supplied to various portions of the receiver. Selection instruction keyboard 15 produces an instruction signal for deriving the desired pair of video and audio signals and supplies it to a controller 17. The controller 17 produces a trigger pulse for deriving the video and audio signals indicated by said instruction signal when such signals are transmitted. This trigger pulse is supplied to a video frame memory 18 and audio regenerator 19. The video frame memory 18 derives only the desired video signal from the still picture broadcasting signal based on said trigger pulse and memorizes one frame picture signal. The memorized signal is repeatedly reproduced and a still picture is reproducted by supplying it to a cathode ray tube 13 as a continuous signal. The audio regenerator 19 derives the desired audio signal from the still picture broadcasting signal and reproduces the voice by supplying it to a speaker 14.

Figure 4:
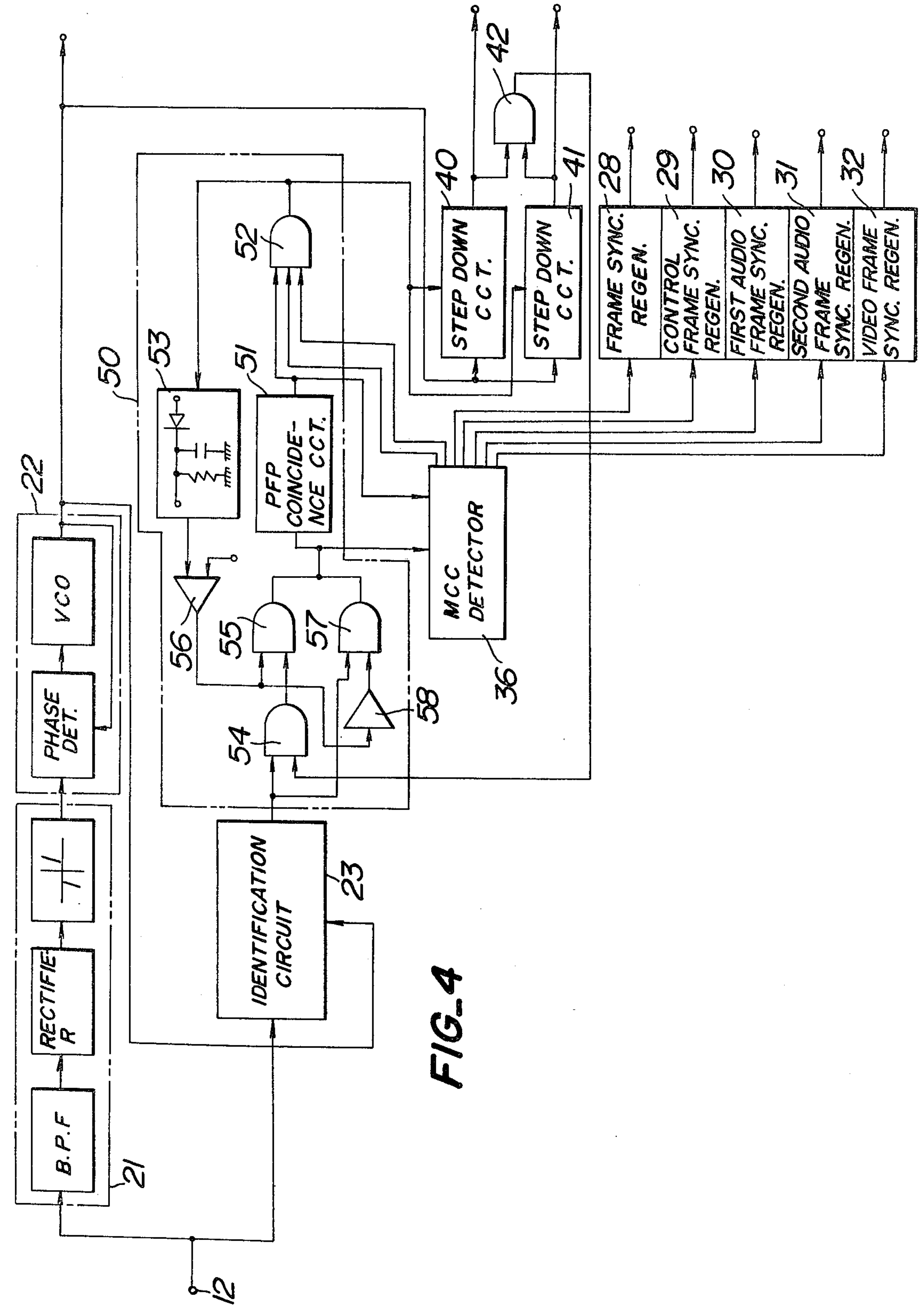
FIG. 4 is a block diagram showing one embodiment of a synchronizing signal regenerator to be used in the still picture broadcasting receiver.

FIG. 4 is a block diagram showing more details of one embodiment of the synchronizing signal regenerator 16 of the still picture broadcasting signal receiver. Detailed explanation for the operation of this circuit has been given in an application Ser. No. 361,802 filed in 1973 now U.S. Pat. No. 3,865,973 so that only a brief explanation will be given hereinafter.

The bit timing signal of the PFP signal and audio PCM signal included in the still picture broadcasting signal supplied to the input terminal 12 is detected by a bit synchronizing signal detector 21. Synchronization of bit synchronizing signal regenerator 22 is obtained by using the detected bit timing signal and a bit signal of about 6.54 MHz synchronized with the bit timing signal is regenerated.

An identification circuit 23 uses the regenerated bit synchronizing signal as its timing pulse and the still picture broadcasting signal supplied from the input terminal 12 is identified. This circuit is provided to obtain a waveform shaped pulse signal by compensating for waveform distortion produced during the transmission of the signal as has been used in the conventional pulse signal transmission technique. The waveform shaped input signal processed by the identification circuit 23 is supplied to both PFP detector 50 and MCC detector 36.

In the PFP detector 50, the output signal of the identification circuit 23 is supplied to PFP coincidence circuit 51 through an AND gate 57 or combination of AND gates 54 and 55. The AND gate 54 is a circuit for gating the input signal by using the gate signal. The AND gates 55 and 57 are the circuits for selectively switching the signal gated by the AND gate 54 and ungated signal and for supplying it to PFP coincidence circuit 51. The PFP circuit 51 produces a coincidence pulse to its output when the PFP signal as indicated in FIG. 2*d* appears in the input signal. Namely, when the sequence of the pulse series "1" and "0" in the input signal becomes the predetermined bit number of, for instance 16 bits and becomes as 0010101010101010, a coincidence pulse is produced. Namely, by using the PFP coincidence circuit 51 the position of the PFP signal in the input signal is detected.

To the MCC detector 36, besides the input signal the coincidence pulse from the PFP coincidence circuit 51 is supplied. The MCC detector 36 uses the coincidence pulse as the reference and detects the presence or absence of the pulses 5–11 representing respective synchronizing signals of the MCC signal transmitted after the PFP signal and detects each of the pulses. This detection can be made by supplying the input signal and the coincidence pulse detected by the PFP coincidence circuit 51 after delaying it up to the position of the detected pulse of the MCC signal to an AND gate and by taking the logical product of said two signals. Among the pulses of the MCC signal thus detected, the detected pulses 5 and 6 representing the horizontal synchronizing signal and audio PCM frame signal respectively are supplied to an AND gate 52. The AND gate 52 is also supplied with the coincidence pulse from the PFP coincidence circuit 51. In order that the timing of the production of said three kinds of pulses become coincident, the PFP coincidence circuit 51 and MCC detector 36 are both provided with a delay circuit. These delay circuits may easily be formed by using shift registers. By this circuit arrangement, a repetition pulse having the greatest common measure frequency of about 5 KHz of the horizontal synchronizing signal frequency $f_H$ (15.734 KHz), and of the audio PCM frame synchronizing signal frequency $f_A$ (about 10.5 KHz) is obtained at the output of the AND gate 52. The output of the AND gate 52 is supplied to step down circuits 40 and 41 as the reset pulse. The step down circuits 40 and 41 count down the frequency of the output regenerated signal of about 6.54 MHz of the bit synchronizing signal regenerator 22 into 1/416 and 1/624, respectively. Accordingly, as far as the frequency of the output signal of the bit synchronizing signal regenerator 22 is accurate, the frequency of the output signals of the step down circuits 40 and 41 accurately coincide with the frequencies of the horizontal synchronizing signal and audio PCM frame synchronizing signal. Therefore, by applying reset pulses from the outside to the step down circuits 40 and 41 signals synchronizing with the reset pulses can be obtained. Namely, the horizontal synchronizing signal and audio PCM frame synchronizing signal are regenerated.

By applying the obtained horizontal synchronizing signal and audio PCM frame synchronizing signal to an AND gate 42, a pulse signal having a period corresponding to the greatest common measure frequency of the $f_H$ and $f_A$ is obtained in the same manner as described with respect to the AND gate 52. By applying this pulse to an AND gate 54, only the synchronizing signal portion including the PFP and MCC signals in the input signal can be gated out from the input signal which corresponds to the period of the greatest common measure frequency of frequency $f_H$ and $f_A$, so that the portion of the input signal not required to the regeneration of the synchronizing signals of the input signal can be rejected in order to obtain a stable regeneration of the synchronizing signals.

When the pulse width of the synchronizing signal obtained from the step down circuits 40 and 41 is narrower than a period corresponding to the sum of the PFP signal and the MCC signal, i.e., narrower than 24 bits, a circuit for widening the pulse width for instance a monostable multivibrator circuit may be provided at the output side of the AND gate 42.

During the transition condition such as starting time of the operation of the device, the signal obtained from the step down circuits 40 and 41 might not be synchronized with the input synchronizing signal. Accordingly, the gate signal produced from the signal, in other words, the gated signal of the input signal by the output of the AND gate 42 appearing at the input of the AND gate 54 may not include the synchronizing signals. In this occasion, the synchronization is not attained. Therefore, in such transition time, the input signal should fully be supplied to the PFP coincidence circuit 51 so as to detect the synchronizing signal at an early occasion. For that purpose, a path for supplying the input signal in an ungated condition is provided. The AND gate 57 corresponds to this circuit. The ungated input signal is passed through the AND gate 57 during the period in which the obtained signals from the step down circuits 40 and 41 are not synchronized with the horizontal synchronizing signal and audio PCM frame signal. After the output signals of the step down circuits 40 and 41 become synchronized with the horizontal synchronizing signal and audio PCM frame synchronizing signal respectively, the gated input signal is supplied through the AND gate 55. The switching of the AND gates 55 and 57 may be effected in the following manner. When the PFP coincidence pulse is obtained from the PFP coincidence circuit 51 and the pulses for the horizontal synchronizing signal and audio PCM frame synchronizing signal are detected from the MCC detector 36, a pulse having a period corresponding to the greatest common measure frequency of the $f_H$ and $f_A$ is obtained at the output of the AND gate 52 as mentioned above. After obtaining this pulse, the horizontal synchronization and the audio PCM frame synchronization are established so that the pulse is supplied to an integrating circuit 53 to hold the voltage exceeding a certain level for a predetermined time. This voltage is supplied to a controlling circuit 56, which produces a "1" signal during the period when the voltage exceeding a certain predetermined voltage level is applied and produces a "0" signal during the period when the applied signal is less than said voltage level. The output of the controlling circuit 56 is applied to the AND gate 55 which passes the gated input signal and to an inverter 58. The inverter 58 produces a "0" output signal when a "1" signal is applied to the input and produces a "1" signal when a "0" signal is applied to the input. The output signal of the inverter 58 is applied to an AND gate 57 which passes the ungated input signal. By this arrangement, when the pulse signal is not obtained at the output of the AND gate 52, namely, the horizontal synchronization and audio PCM frame synchronization are not attained, the "0" signal is applied to the AND gate 55 and the inverter 58 from the controlling circuit 56. Accordingly, the gated input signal does not pass the AND gate 55, but as the "1" signal appears at the output of the inverter 58 the ungated input signal passes the AND gate 57 and is supplied to the PFP coincidence circuit 51 and to the MCC detector 36.

In the manner as briefly stated above, the bit synchronizing signal, the horizontal synchronizing signal, and the audio PCM frame synchronizing signal can be regenerated.

Furthermore, for regenerating the other synchronizing signals the pulses representing respective synchronizing signals are detected by the MCC detector 36 and synchronization of the various signals generated by the respective synchronizing signal regenerators may be obtained.

Frame synchronizing signal regenerator 28 regenerates a synchronizing signal having a repetition frequency of 30 Hz representing the switching time of each frame. To the frame synchronizing signal regenerator 28, a detected pulse signal 7 shown in FIG. **2*d* is supplied from the MCC detector 36. Control frame synchronizing signal regenerator 29 regenerates a synchronizing signal having a pulse width of 1/30 second and repetition frequency of 1 Hz for showing the position of the control frame C. First audio frame synchronizing signal regenerator 30 and second audio frame synchronizing signal regenerator 31 regenerate synchronizing signals showing the audio first frame and audio second frame. These synchronizing signals are pulse signals having a pulse width of 1/30 second and repetition frequency of 10 Hz. Video frame synchronizing signal regenerator 32** regenerates a synchronizing signal for showing the video frame V. The synchronizing signal for showing the video frame V has a pulse width of 1/10 second and repetition frequency of 10 Hz and has a different phase from the synchronizing signals representing audio first and audio second frames. Furthermore, this synchronizing signal is a pulse series having one void pulse in one second period corresponding to the time of the control frame C.

Among the synchronizing signals, the synchronizing signals for showing the control frame C, audio first frame and audio second frame, and the video frame are all pulse signals having the pulse width of 1/10 second. The output signal detected from the MCC detector 36 is a signal producing a 1/10 second period at each repetition frequency of the 5 KHz repetition period in the circuit shown in FIG. 4.

According to the present invention, a plurality of synchronizing signals may be regenerated in a stable manner from the signal detection of the MCC signal by a very simple circuit.

Figure 5:
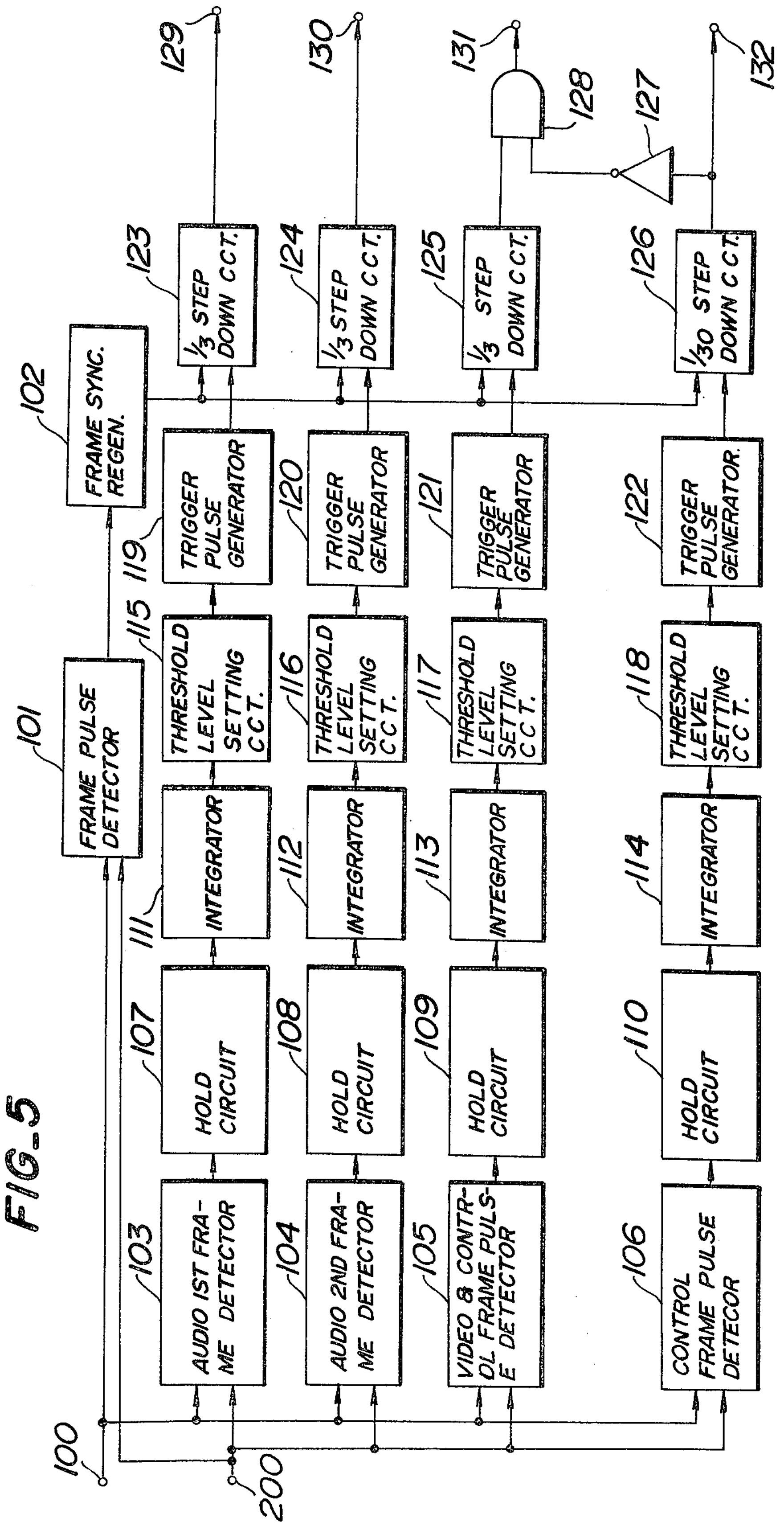
FIG. 5 is a block diagram showing the essential part of one embodiment of the synchronizing signal regenerator according to the invention.

FIG. 5 is a block diagram showing an essential portion of the embodiment of the present invention.

Figure 6:
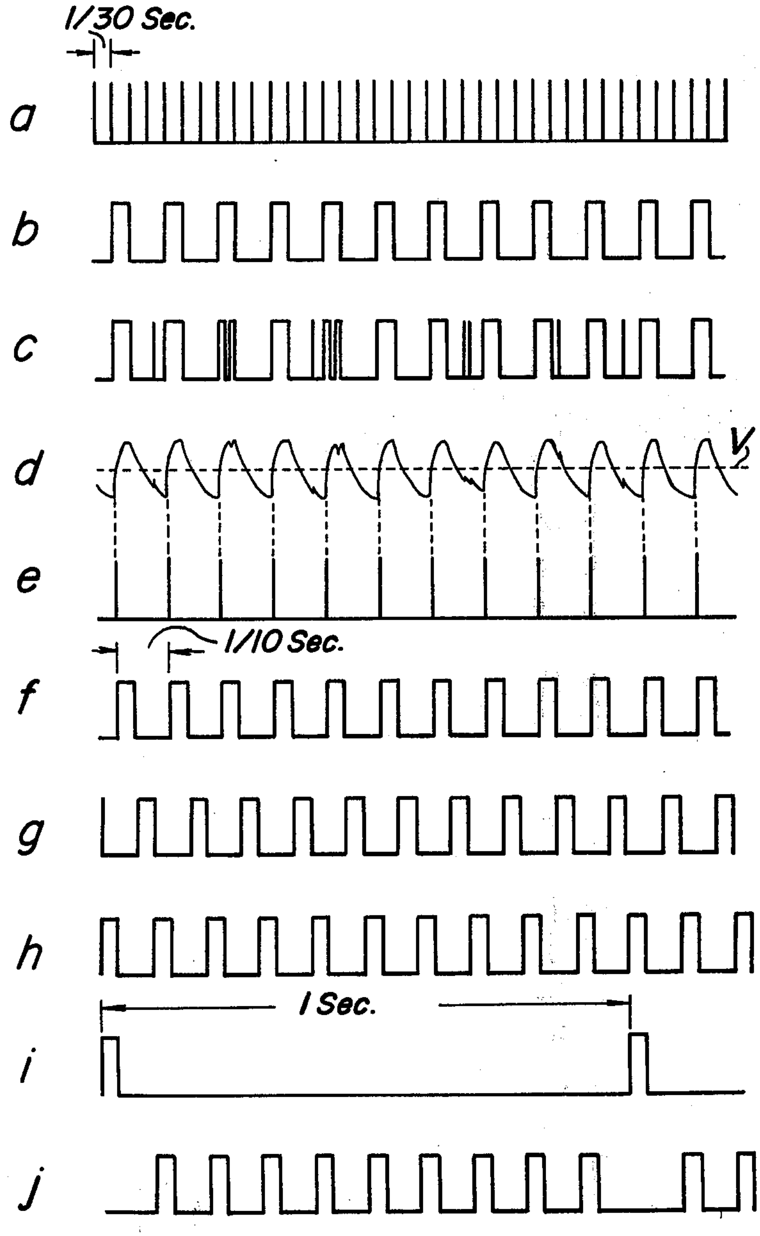
FIG. 6 is a signal waveform diagram for explaining the operation of a circuit shown in FIG. 5.

FIG. 6 is a signal waveform diagram for explaining the operation of the circuit.

In FIG. 5, 100 is an input terminal of the input signal to which a still picture broadcasting signal after being processed by the identification circuit 23 of FIG. 4 to be a waveform shaped pulse signal is supplied through the AND gate 55 or 57. 200 is an input terminal to which the coincidence pulse obtained at the output signal of the PFP coincidence circuit 51 is supplied. The input signal supplied to the input terminal 100 and the coincidence pulse supplied to the input terminal 200 are supplied to a frame pulse detector 101, an audio first frame pulse detector 103, an audio second frame pulse detector 104, a video and control frame pulse detector 105, and a control frame pulse detector 106. The detector circuits 101, 103–106 for detecting pulses representing various synchronizing signals in the MCC signal corresponds to the MCC detector 36 shown in FIG. 4.

102 is a frame synchronizing signal regenerator for regenerating the frame synchronizing signal having a repetition period of 1/30 second as shown in FIG. 6*a*. The pulse for representing the frame synchronizing signal in the MCC signal only exists in the MCC signal inserted at the boundary between the control frame C and the audio frame A and that between the video frame V and the audio frame A and that between audio first and second frames. Accordingly, by obtaining synchronization of the frame synchronizing signal regenerator 102 by using the output of the frame pulse detector 101, a frame synchronizing signal shown in FIG. 6*a* may be obtained.

107–110 are hold circuits for holding the amplitude of an applied pulse over a predetermined time and to convert the pulse into one pulse so far as the pulses are supplied in a predetermined period. In the present embodiment, if the applied pulse has a repetition frequency more than 5 KHz, then the pulse may be converted into one continuous pulse. The hold circuits 107–110 may be formed from integrating circuits of monostable multivibrator circuits. The output signal of the frame pulse detectors 103–106 for detecting the audio first frame pulse and other pulses assumes a pulse series having one television frame period of 1/30 second existing only at the corresponding frame period and having a repetition frequency of about 5 KHz. By supplying the pulse series signal to the hold circuits 107–110, the input signal may be converted into pulses each having a 1/30 second pulse width. For instance, by supplying the output of the audio first frame pulse detector 103 to the hold circuit 107, a pulse signal synchronized with the audio first frame as shown in FIG. 6*b* may be obtained. By using such pulse signals obtained in a manner explained above, various frame synchronizing signals may be regenerated accurately. However, if the signal to noise ratio of the input signal had deteriorated, a portion of the PFP signal or MCC signal of the input signal may be damaged or lost by the noise so that an erroneous code signal may be produced. In this occasion, the PFP coincidence circuit may fail to detect some of the PFP signals or erroneously detect noises occurring at the other portion of the PFP signal to be the PFP signal. As a consequence, a portion of the synchronizing signal may be eliminated from the output signal of the audio first frame pulse after detection and after passing the hold circuit for instance, as shown in FIG. 6*c* or it may include an erroneous pulse at a location where the pulse should not exist. Accordingly, by using such an output signal, a correct synchronizing signal cannot be regenerated.

Integrators 111–114, threshold level setting circuits 115–118, and trigger pulse generators 119–122 are the circuits to correctly regenerate various frame synchronizing signals by using such output signal affected by the noise. Namely, the output signal of the hold circuit 107 as shown in FIG. 6*c* is applied to an integrator 111 so as to obtain a signal having a waveform as shown in FIG. 6*d*. This signal may be applied to a threshold level setting circuit 115 to detect a signal having amplitude larger than a predetermined level V so as to produce a trigger pulse from the trigger pulse generator 119 when a signal having amplitude larger than the level V is applied. By this arrangement, the trigger pulse is not influenced from the noise as shown in FIG. 6*e* and will be a signal synchronized with the audio first frame. By synchronizing a step down circuit 123 for making frequency division of the frequency of the output signal of the frame synchronizing signal regenerator 102 into ⅛ frequency by using said trigger pulse, an audio first frame synchronizing signal as shown in FIG. 6*f* may be obtained at an output of terminal 129.

In the same manner, by using an audio second frame pulse detector 104, a hold circuit 108, an integrator 112, a threshold level setting circuit 116, a trigger pulse generator 120, and a step down circuit 124 for making ⅛ frequency division of an applied signal, the audio second frame synchronizing signal succeeding to the audio first frame as shown in FIG. 5*g* may be obtained. Furthermore, by using a control frame pulse detector 106, a hold circuit 110, an integrator 114, a threshold level setting circuit 118, a trigger pulse generator 122 and a step down circuit 126 for making 1/30 frequency division of an applied signal, the control frame synchronizing signal as shown in FIG. 6*i* may be regenerated. Also, by using a video and control frame pulse detector 105, a hold circuit 109, an integrator 113, a threshold level setting circuit 117, a trigger pulse generator 121, and a step down circuit 125 for making ⅛ frequency division of an applied signal, a pulse signal as shown in FIG. 6*h* may be obtained. The pulse signal obtained at the output of the step down circuit 125 and an inverted signal of the control frame synchronizing signal obtained at the output of the step down circuit 126 and inverted by an inverter 127 for supplied to an AND gate 128. Then the video frame synchronizing signal as shown in FIG. 6*j* may be obtained.

Figure 7:
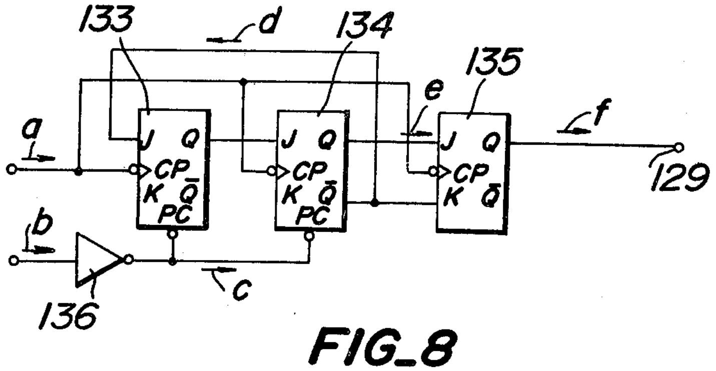
FIG. 7 is a block diagram showing one embodiment of a step down circuit for dividing the frequency of an applied signal into ⅛.

In the foregoing explanation, in order to simplify the explanation, the trigger pulse shown in FIG. 6*e* is assumed to be coincident at the front porch of the pulse of the audio first frame synchronizing signal shown in FIG. 6*b*. However, speaking more strictly, phases of the both pulses are not in coincidence owing to a fact that integrator circuits are employed and the trigger pulse may be delayed in some extent. According to the present invention, even if there is a delay of the trigger pulse, a synchronizing signal exactly synchronized with the input signal can be regenerated. FIG. 7 is a block diagram showing one practical embodiment of a step down circuit which has introduced a consideration for such delay of the trigger pulse.

Figure 8:
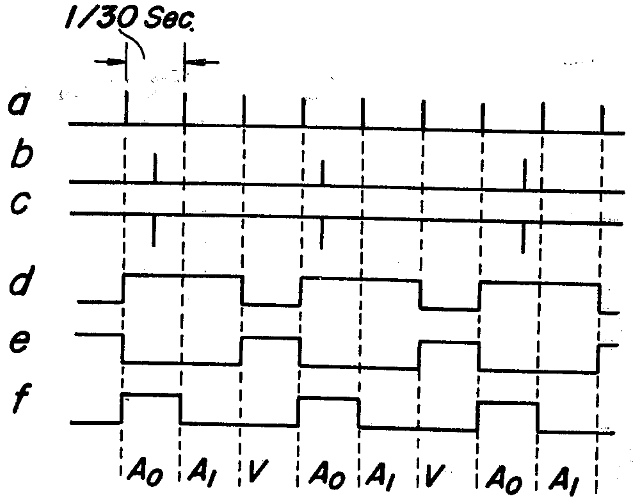
FIG. 8 is a signal waveform diagram for explaining the operation of the circuit shown in FIG. 7.

In FIG. 7, 133, 134 and 135 are J-K flip-flop circuits and 136 is an inverter. FIG. 8 is a signal waveform diagram for explaining the operation of the step down circuit shown in FIG. 7.

Only the audio first frame synchronizing signal is taken into consideration for the regeneration of the same by using the step down circuit.

FIG. 8*a* shows the frame synchronizing signals shown in FIG. 6*a* on a greatly elongated time scale. FIG. 8*b* shows the output trigger pulse of the trigger pulse generator 119. This waveform of the trigger pulse indicates the fact that the repetition frequency may not be in coincidence accurately and it depends on the signal waveform integrated by the integrator 111. In FIG. 7, notations *a–f* indicate that the corresponding signal indicated in FIG. 8*a* to FIG. 8*f* exists in the corresponding portion.

The output signal of the frame synchronizing signal regenerator 102 as shown in FIG. 8*a* is supplied to respective clock pulse input terminals CP of the J-K flip-flop circuits 133, 134 and 135. The output signal of the trigger pulse generator 119 as shown in FIG. 8*b* is at first inverted by an inverter 136 as shown in FIG. 8*c* and then supplied to a clear input terminal PC of the J-K flip-flop circuits 133 and 134. By the pulse as shown in FIG. 8*c*, the J-K flip-flop circuits 133 and 134 are reset and the output of the output terminal Q of the J-K flip-flop circuit 134 assumes a logical value "0" and the output on the terminal $\overline{Q}$ assumes the logical value "1". By a pulse of the frame synchronizing signal applied after said pulse shown in FIG. 8*c*, the logical values of the outputs of the J-K flip-flop circuit 133 are inverted so that the output on the terminal Q assumes logical value "1" but the outputs of the J-K flip-flop circuit 134 are maintained as unchanged. By a next pulse succeeding to said frame synchronizing signal, the logic of the both outputs of the J-K flip-flop circuits 133 and 134 are inverted so that the output on the terminal Q of the J-K flip-flop circuit 134 shows a waveform as shown in FIG. 8*e*. The signal thus obtained and shown in FIG. 8*e* is further shifted over one period duration of the frame synchronizing signal to be used as an input clock pulse by the J-K flip-flop circuit 135; then an audio first frame synchronizing signal as shown in FIG. 8*f* can be obtained.

Figure 9:
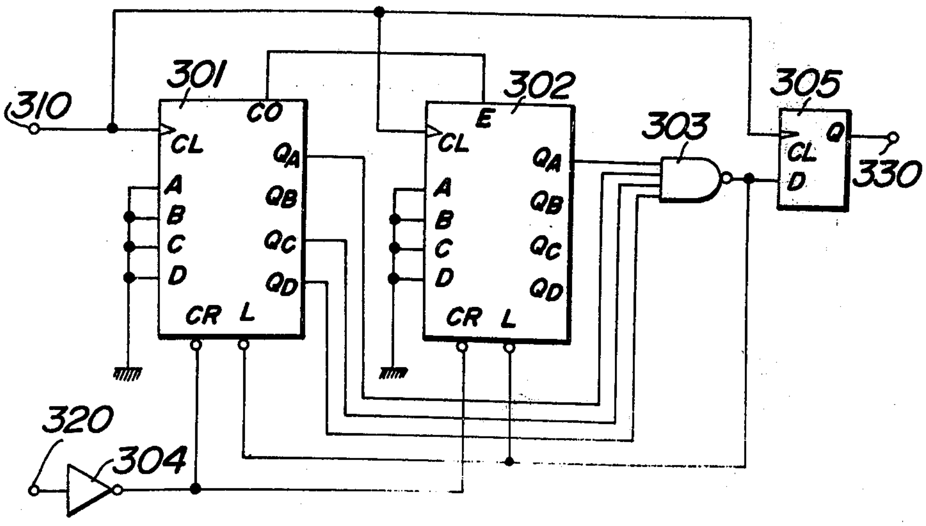
FIG. 9 is a block diagram showing one embodiment of a step down circuit for dividing the frequency of an applied signal into 1/30.

As for the step down circuits 124 and 125 the same circuit arrangement as shown in FIG. 7 may be used. The step down circuit 126 for making 1/30 frequency division of the applied signal may be formed by increasing the number of J-K flip-flop circuits. However, in case of a larger frequency division rate, the circuit construction can further be simplified by using a conventional counter circuit. For instance, counter circuit SN74161 (Trade name) made by Texas Instruments, Incorporated may be used to form such 1/30 step down circuit. One embodiment thereof is shown in FIG. 9. In FIG. 9, 301 and 302 are the counter circuits mentioned above, in which clock pulse input terminals CL are applied with the frame synchronizing signal of 30 Hz through an input terminal 310 obtained from frame synchronizing signal regenerator 102 as the signal to be frequency divided. A trigger pulse produced from the trigger pulse generator 122 synchronizing with the control frame is applied to an invertor 304 through an input terminal 320 and then supplied to clear pulse input terminals CR of the counter circuits 301 and 302 after polarity inversion. $Q_A$, $Q_B$, $Q_C$, $Q_D$ are output terminals for the order of $2^0, 2^1, 2^2, 2^3$, respectively. A, B, C, D are data input terminals. In this embodiment all the terminals are connected to ground and fixed to "0" potential level. CO is the output terminal of the carry when the number of clock pulses applied to the input terminal reaches the highest number to be counted by the counter. In the present example, if this number reached 15 at the counter 301, then carry "1" is delivered to this output terminal CO. When the signal "0" is applied to an input terminal L, data each corresponding to the data of the data input A–D appear at the output of $Q_A$–$Q_D$ with synchronism with the next appearing clock pulse. By supplying the outputs from the output terminals $Q_A$, $Q_C$ and $Q_D$ of the counter 301, and that of the output terminal $Q_A$ of the counter 302 to a 4-input NAND gate 303, the NAND gate 303 delivers "0" output only when the four output signals coming into the input terminals assume "1", simultaneously. Namely, after clearance of the counter circuits 301 and 302 and when the number of pulses applied to the input terminal 310 becomes 29, the NAND gate 303 delivers "0" output. This "0" signal is applied to terminals L of the counters 301 and 302 so that at the next clock pulse applied to the input terminal 310 which corresponds to 30th pulse, the output signals of the output terminals $Q_A$–$Q_D$ of the two counters assume all "0". In this occasion, the output of the NAND gate 303 again returns to value "1" so that the output of the NAND gate 303 assumes a negative polarity pulse signal having a pulse width of 1/30 second once at each 30 pulses, i.e., once with one second. This negative polarity pulse has the same repetition frequency and pulse width as that of the control frame synchronizing signal. However, said negative pulse is produced at synchronism with the 29th frame synchronizing signal after application of the trigger pulse applied to the input terminal 320 so that this negative pulse is produced one frame synchronizing period earlier than the required phase. The pulse signal obtained from the NAND gate 303 is applied to D-type flip-flop circuit 305. In the D-type flip-flop circuit 305, the phase of the input pulse is delayed by one frame synchronizing period by using the frame synchronizing signal as the clock pulse and also the polarity is reversed. By this process, a correct control frame synchronizing signal is obtained at the output terminal 330 of the D-type flip-flop circuit 305.

Figure 10:
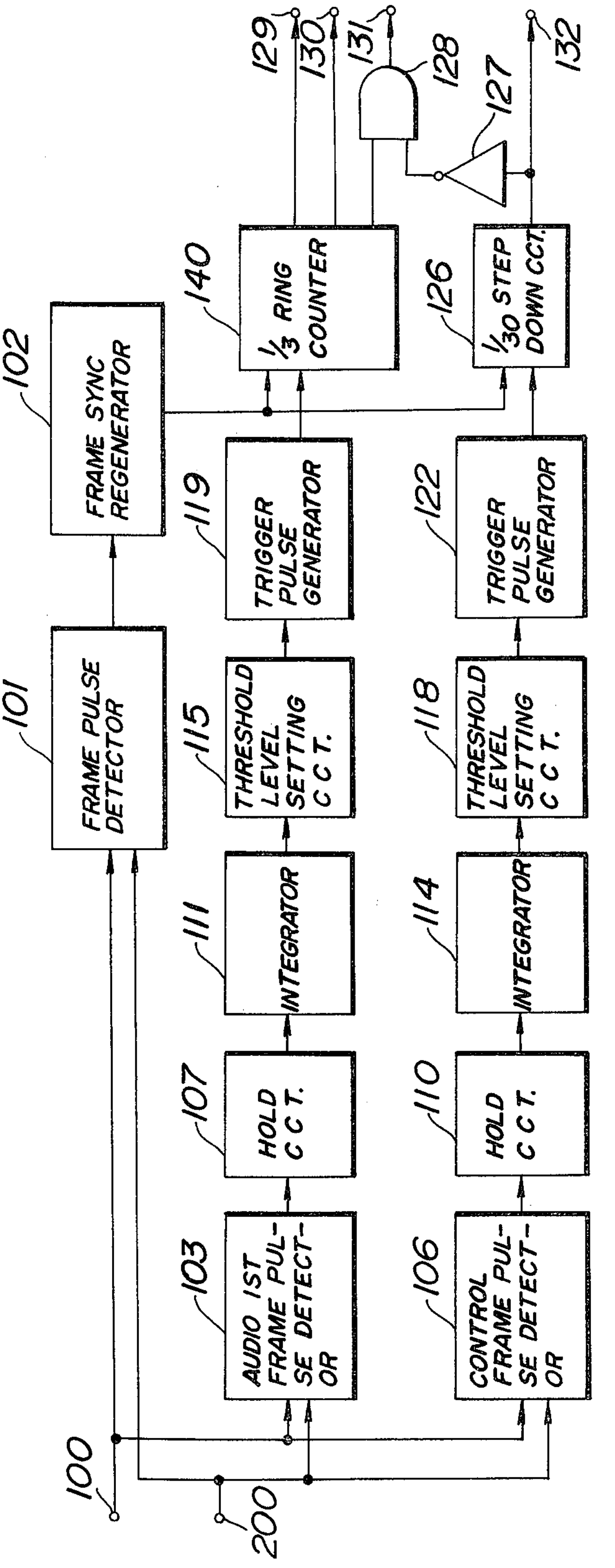
FIGS. 10–12 are block diagrams showing the essential parts of modified embodiments of the synchronizing signal regenerator according to the invention.

FIG. 10 is a block diagram showing a modified embodiment of the present invention. In this circuit shown in FIG. 10, the step down circuit 123 of FIG. 5 making ⅓ frequency division of the applied frequency is replaced by a ring counter 140 and the overall circuit arrangement is made simplified. In the circuit shown in FIG. 10, the audio second frame pulse detector 104, the video and control frame pulse detector 105, the hold circuits 108 and 109, the integrators 111 and 112, the threshold level setting circuits 116 and 117, the trigger pulse generators 120 and 121, and the step down circuits 124 and 125, provided in the circuit of FIG. 5 have been eliminated.

As is well known in the art, a ring counter for making frequency division of the frequency of the applied signal into $1/n$ produces at its $n$ output terminals signals having a phase different by $2\pi\times1/n$ (radian) from each other. Accordingly, by supplying 30 Hz frame synchronizing signal obtained as an output signal of the frame synchronizing signal regenerator 102 to a ring counter 140 effecting ⅓ frequency division, three signals each having a 1/30 second pulse width and repetition frequency of 10 Hz and having a phase of $2\pi\times⅓$ (radian) from each other may be obtained at the respective output terminals. To this end, by using the audio first frame pulse detected by said audio first frame pulse detector 103, a trigger pulse is produced through a hold circuit 107, an integrator 111, a threshold level setting circuit 115, and a trigger pulse generator 119 in the same manner with the previous embodiment. By applying the trigger pulse to the ring counter 140 as the reset pulse, frame synchronizing signals which are the combination of the audio first frame synchronizing signal, audio second frame synchronizing signal, and a frame synchronizing signal for a combination of the video frame and the control frame can be obtained, respectively. Also by processing the regenerated control frame synchronizing signal produced by a control frame pulse detector 106, a hold circuit 110, an integrator 114, a threshold level setting circuit 118, a trigger pulse generator 122 and 1/30 step down circuit 126 for making 1/30 frequency division of the applied frequency to be polarity inverted signal by using an inverter 127 and applying the polarity inverted signal to an AND gate 128 together with one output of the ⅓ ring counter 140, the video frame synchronizing signal can separately be produced in the same manner with the previous embodiment.

In the present embodiment, instead of detecting the audio first frame pulse, the audio second frame pulse or the video and control frame pulses may be detected so as to correctly reproduce various synchronizing signals in the same manner.

Even if there is a delay in the trigger pulse applied to the ring counter 140 as mentioned above, which might be caused by an influence of the integrator, the respective synchronizing signals having correct phase may be obtained in the same manner as has been explained above with respect to the circuit of FIG. 7 by using the frame synchronizing signal as the clock pulse to the flip-flop circuits consisting of the ring counter 140.

Figure 11:
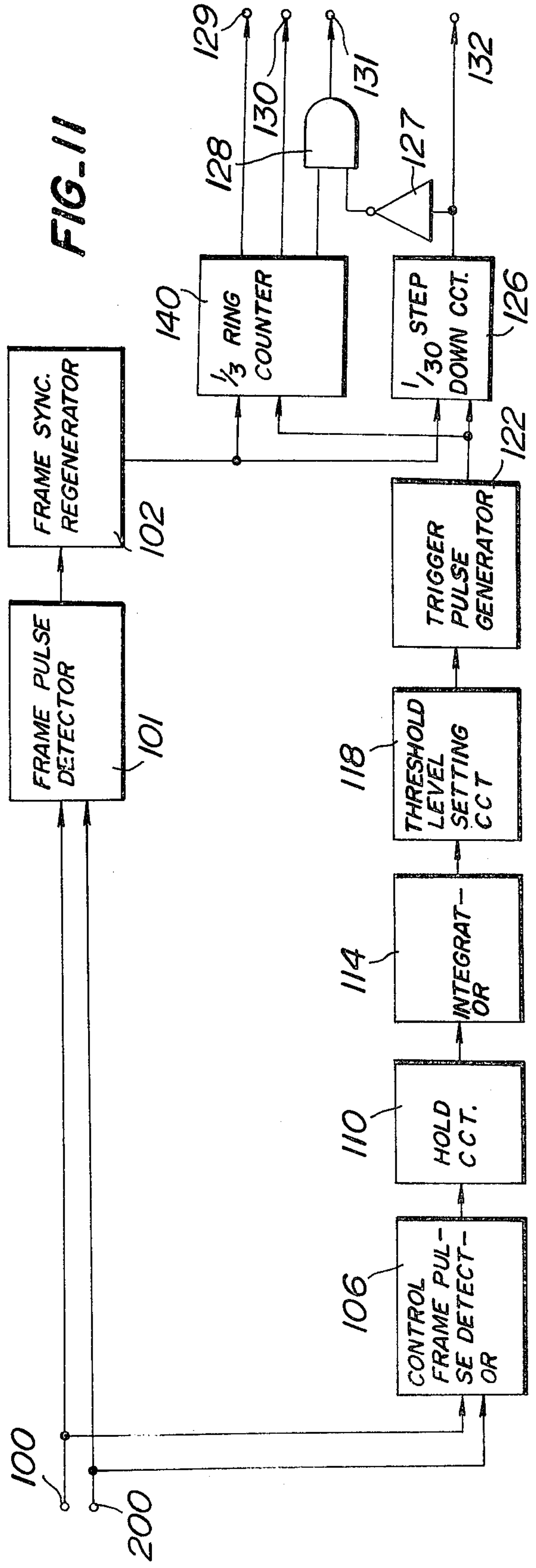

FIG. 11 is a block diagram showing another modified embodiment of the synchronizing signal regenerator according to the present invention. This circuit has the simplest circuit arrangement in which the audio first and second frame synchronizing signals, video frame synchronizing signal, and control frame synchronizing signal may be regenerated by using only the trigger pulse obtained from the detection of the control frame pulse and be resetting ⅓ ring counter 140 and 1/30 step down circuit 126 for making 1/30 frequency division of the applied frequency. In this circuit arrangement, a fact that the control frame C is inserted at the top of a submaster frame as shown in FIG. 1 is utilized and in which the trigger pulse obtained from the detected signal of the control frame pulse is used as a reset pulse of the ring counter 140. Accordingly, among the output signals of the ring counter 140, the signal synchronized with the trigger pulse is a signal which is a sum of the control frame synchronizing signal and the video frame synchronizing signal. Therefore, in order to obtain only the video frame synchronizing signal from said signal, a control frame synchronizing signal obtained from the step down circuit 126 synchronized with the same trigger pulse is inverted by an inverter 127 and is applied to an AND gate 128 to which also the above signal is so applied to produce a logic product of the two signals. Among the output signals of the ring counter 140, the other two signals other than explained above are the audio first frame synchronizing signal and the audio second frame synchronizing signal.

In the present embodiment, the trigger pulse is only produced at a rate of once in one second, so that beside the control frame synchronizing signal, the regenerated synchronizing signals are the signals having 10 or 9 pulses in one second. Accordingly, although not triggered at each pulse the 30 Hz frame synchronizing signal obtained from frame synchronizing signal regenerator 102 is synchronized exactly with all of the frames, so that an accurate synchronizing signal may be obtained even triggering only once in one second duration.

Figure 12:
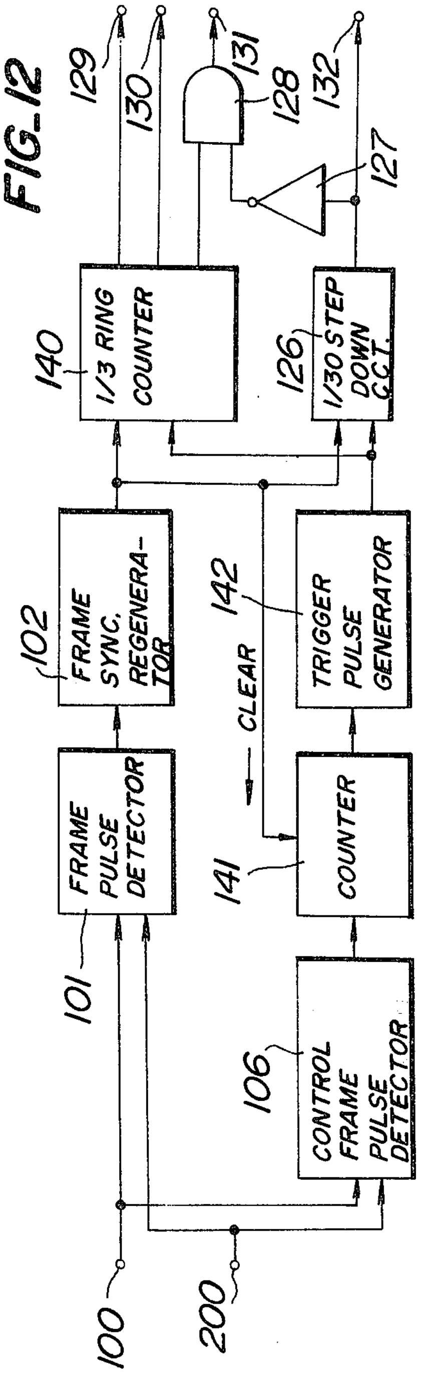

FIG. 12 is a block diagram showing a still further different embodiment of the present invention. In this circuit, by using the trigger pulse obtained from the detection signal of the control frame pulse in the same manner as explained in the embodiment of FIG. 11, the 4 kinds of frame synchronizing signals are regenerated. The difference of this circuit from the embodiment shown in FIG. 11 is the process for producing the trigger pulse. Namely, the output signal of the control frame pulse detector 106 is applied to a counter 141 and the number of pulses in the output signal is counted. In the counter 141 a "1" signal is produced when the counted pulse number assumes a predetermined number and is applied it to a trigger pulse generator 142. The trigger pulse generator 142 produces a trigger pulse by the "1" signal obtained from the counter 141. After obtaining the trigger pulse, the four kinds of frame synchronizing signals may be regenerated in the same manner with the previous embodiment.

The synchronizing signal consisting of the MCC signal and the PFP signal in the control frame is inserted at a horizontal scanning frequency $f_H$ so that pulse 8 in the MCC signal showing the control frame synchronizing signal is also obtained at the horizontal scanning period during the control frame period. As mentioned above, in the receiver having the circuit construction shown in FIG. 4, the synchronizing signal portion of the input signal is gated at the greatest common measure frequency of the frequencies $f_H$ and $f_A$ so that at the output of the control frame pulse detector 106 a pulse series signal of about 5 KHz having a duration of 1/30 second at each one second is obtained. In other words, at the output of the control frame pulse detector 106, a pulse series consisting of about 170 pulses may appear at each one second. Accordingly, the number of counters preset by the counter 141 may be selected as a number smaller than about 170 by taking into consideration the fact that there might exist nondetected pulses due to the influence of noise by the control frame pulse detector 106 and also as a number greater than the pulse number of the pulses which might be detected other than the control frame due to error. The counter 141 is cleared by an output signal of the frame synchronizing signal regenerator 102.

In the circuit arrangement according to the present invention, the trigger pulse may be produced even if all of the control frame pulses are not detected. Furthermore, even if some pulses may be produced from the control frame pulse detector at the time other than the control frame, the circuit is cleared by the frame synchronizing signal before the detected number arrives to the previously determined number so that the erroneous signal is not applied to the trigger pulse generator.

The practice of using the counter in the above mentioned embodiment may be used in any of the foregoing embodiments.

What is claimed is:

1. A synchronizing signal regenerator for regenerating a first synchronizing signal including a pulse series having a predetermined certain repetition frequency being intermittently transmitted at a predetermined period for a predetermined certain duration, and a second synchronizing signal synchronized with boundaries of the pulse series of the first synchronizing signal and inserted in a repetition period for a period equal to a width of the pulse series intermittently inserted, from a composite signal including said first and second synchronizing signals, the regenerator comprising:

a means for detecting said second synchronizing signal and for regenerating said detected second synchronizing signal;

a means for detecting and deriving the pulse series of said first synchronizing signal;

a hold circuit for producing a wide width output pulse signal when a pulse of the detected pulse series is obtained at an interval less than a predetermined time interval;

an integrator for integrating the output pulse signal of the hold circuit and providing an output signal;

a means for producing a trigger pulse when an amplitude of the output signal of the integrator exceeds a certain determined level; and a means for generating a signal synchronized with said intermittently transmitted frequency of the pulse series of said first synchronizing signal, said generating means including a frequency dividing means for dividing the frequency of said regenerated second synchronizing signal obtained from the second synchronizing signal regenerating means, including means for using said regenerated second synchronizing signal as a clock pulse and means for using the trigger pulse obtained from said trigger pulse producing means as a clear pulse.

2. A synchronizing signal regenerator for receiving a composite signal including various information signals inserted in the composite signal at certain predetermined positions, in which $n$ information signals are divided in predetermined certain time units, and in which the 1st to $(n-2)$th information signals are arranged in a phase shift relationship in one time unit and at repetition period of each $(n-1)$ of said time units, the $(n-1)$th information signal is arranged with respect to the rest of the portion of the $(n-1)$ time units for a time corresponding to $(n-1) \times M$ times the units, wherein M is a positive integer, and the $n$th information signal is arranged in the rest of the portion at which the $(n-1)$th information signal is not arranged, and a first synchronizing signal synchronized with boundaries of the information signals and a plurality of second synchronizing signals for representing the transmission period of said various information signals and required for the regeneration of said information signals being pulse coded in a manner separately identifiable and inserted in a predetermined portion of said information signals, and for generating signals synchronized with the transmission period of said respective information signals, the regenerator comprising:

a means for detecting and regenerating the first synchronizing signal synchronized with the boundaries of the information signals;

$n$ number of detecting means for detecting respective coded signals of the plurality of the second synchronizing signals, and for deriving signals for indicating transmission periods of said 1st to $(n-2)$th information signals, a signal for indicating the transmission period of a sum signal of the $(n-1)$th and $n$th information signals, and a signal for indicating the transmission period of the $n$th information signal;

$n$ number of hold circuits to which respective derived signals of said $n$ detecting means are supplied, and for producing respective wide width output pulse signals when the derived signals of said $n$ detecting means have an interval less than a predetermined time;

$n$ number of integrators for integrating respective output signals of said $n$ hold circuits and providing output signals;

$n$ trigger pulse generators for producing respective trigger pulses when the amplitude of the output signals of the $n$ integrators exceeds respective predetermined values;

$(n-1)$ step down circuits for frequency dividing the frequency of said regenerated first synchronizing signal into a $1/(n-1)$ frequency, including means for using the first synchronizing signal regenerated by said first synchronizing signal regenerating means as a clock pulse, and means for using trigger pulses produced by the trigger pulse generators as clear pulses, said trigger pulses being produced from the trigger pulse generators and which are synchronized with signals detected by the detecting means for deriving the signals for indicating the transmission period of the 1st to $(n-2)$th information signals, and for indicating the transmission period of the information signal which is a sum of the $(n-1)$th and nth information signals, respectively;

a step down circuit for dividing the frequency of the regenerated first synchronizing signal into $1/M(n-1)$, including means for using the regenerated first synchronizing signal as a clock pulse and means for using the trigger pulse generated by the trigger pulse generator and which is synchronized with the signal detected by the detecting means for deriving a signal for indicating the transmission period of the $n$th information signal as a clear pulse; and a means for obtaining a logic product of the output signal of the step down circuit which uses the trigger pulse synchronized with the signals for indicating the transmission period of the sum of the $(n-1)$ and $n$th information signals among the step down circuits for frequency dividing the frequency of the regenerated first synchronizing signal into $1/(n-1)$, and an inverted signal of the output signal of said step down circuit for dividing the frequency of the regenerated first synchronizing signal into $1/M(n-1)$.

3. A synchronizing signal regenerator for receiving a composite signal including various information signals inserted in the composite signal at certain predetermined positions, in which $n$ information signals are divided in predetermined certain time units, and in which the 1st to $(n-2)$th information signals are arranged in a phase shift relationship in one time unit and at a repetition period of each $(n-1)$ of said time units, the $(n-1)$th information signal is arranged with respect to the rest of the portion of the $(n-1)$ time units for a time corresponding to $(n-1) \times M$ times the units, wherein M is a positive integer, and the nth information signal is arranged in the rest of the portion at which the $(n-1)$th information signal is not arranged, and a first synchronizing signal synchronized with boundaries of the information signals and a plurality of second synchronizing signals for representing the transmission period of said various information signals and required for the regeneration of said information signals being pulse coded in a manner separately indentifiable and inserted in a predetermined portion of said information signals, and for generating signals synchronized with the transmission period of said respective information signals, the regenerator comprising:

a means for detecting said first synchronizing signal and for regenerating said first synchronizing signl synchronized with boundaries of said various information signals;

a first detecting means for detecting a signal indicating the transmission period of either the second synchronizing signal representing the transmission period of said 1st to ($n$−2)th information signals, or the second synchronizing signal representing the transmission period of the information signal which is a sum of the ($n$−1)th and nth information signals;

a second detecting means for detecting the second synchronizing signal representing the transmission period of said ($n$−1)th information signal;

first and second hold circuits applied with output signals of said first and second detecting means, respectively, and for producing respective wide width output pulse signals when the amplitude of the output signals of the respective first and second detecting means is obtained at an interval less than a previously determined interval, respectively;

first and second integrators for integrating output signals of said first and second hold circuits, respectively, and providing output signals;

first and second trigger pulse genertors for generating respective trigger pulses when the amplitude of the output signals of the first and second integrators exceeds a predetermined value, respectively;

a ring counter for dividing the frequency of said regenerated first synchronizing signal into 1/($n$−1) and for producing ($n$−1) output signals having phases different by $2\pi/(n-1)$ radians from each other, including means for using the first synchronizing signal regenerated by said first synchronizing signal regenerator as a clock pulse, and means for using the output signal of said first trigger pulse generator as a clear pulse;

a step down circuit for dividing the frequency of said regenerated first synchronizing signal into an output signal of 1/M($n$−1) frequency, including means for using said regenerated first synchronizing signal as a clock pulse, and means for using the output signal of said second trigger pulse generator as a clear pulse; and a means for taking a logic product of an inverted output signal of said step down circuit, and a signal among the output signals of said ring counter and synchronized with the transmission period of a signal which is a sum of said ($n$−1)th information signal and nth information signal.

4. A synchronizing signal regenerator for receiving a composite signal including various information signals inserted in the composite signal at certain predetermined positions, in which $n$ information signals are divided in predetermined certain time units, and in which the 1st to ($n$−2)th information signals are arranged in a phase shift relationship in one time unit and at a repetition period of each ($n$−1) of said time units, the ($n$−1)th information signal is arranged with respect to the rest of the portion of the ($n$−1) time units for a time corresponding to ($n$−1) × M times the units, wherein M is a positive integer, and the nth information signal is arranged in the rest of the portion at which the ($n$−1)th information signal is not arranged, and a first synchronizing signal synchronized with boundaries of the information signals and a plurality of second synchronizing signals for representing the transmission period of said various information signals and required for the regeneration of said information signals being pulse coded in a manner separately identifiable and inserted in a predetermined portion of said information signals, and for generating signals synchronized with the transmission period of said respective information signals, the regenerator comprising:

a means for detecting said first synchronizing signal and for regenerating said first synchronizing signal synchronized with boundaries of said information signals;

a detecting means for detecting and deriving a synchronizing signal indicating the transmission period of the ($n$−1)th information signal among said second synchronizing signals and providing an output signal;

a hold circuit for producing a wide width output pulse signal at its output when the output signal of said detecting means is obtained at an interval less than a predetermined time interval;

an integrator for integrating the output pulse signal of said hold circuit and providing an output signal;

a trigger pulse generator for producing a trigger pulse when the amplitude of the output signal of said integrator exceeds a predetermined value;

a ring counter for dividing the frequency of said regenerated first synchronizing signal into 1/($n$−1) and for producing ($n$−1) output signals having phases which are $2\pi(n-1)$ radians different from each other, including means for using said regenerated first synchronizing signal as a clock pulse, and means for using the trigger pulse of the trigger pulse generator as a clear pulse;

a step down circuit for dividing the frequency of said regenerated first synchronizing signal into an output signal of 1/M($n$−1) frequency, including means for using said regenerated first synchronizing signal as a clock pulse and means for using the trigger pulse of the trigger pulse generator as a clear pulse; and a means for producing a logic product of an inverted signal of the output signal of said step down circuit and a signal synchronized with the transmission period of a signal which is the sum of the ($n$−1)th and $n$th information signals among the output signals of said ring counter.

5. A synchronizing signal regenerator for regenerating synchronizing signals synchronized with respective transmission periods of a video signal and an audio signal by receiving a composite signal including a video signal and an audio signal arranged in a predetermined sequence and for durations having a predetermined integral ratio, the composite signal further comprising pulse coded first and second synchronizing signals required for the regeneration of said video and audio signals, a pulse coded third synchronizing signal synchronized with at least the boundary of said video signal and said audio signal and having a repetition period corresponding to an integral multiple of the repetition frequency of the transmission period of said video signal or audio signal, pulse coded fourth and fifth synchronizing signals for indicating the transmission period of said video and audio signals and a further synchronizing signal having a fixed pulse pattern and including a predetermined number of pulses for detecting the insertion position in the composite signal of said synchronizing signals, wherein the synchronizing signals are inserted at a predetermined repetition period in a predetermined duration in the respective video and audio signals, the regenerator comprising:

a means for detecting said fixed pulse pattern of the further synchronizing signal and for deriving an output signal for gating out from the composite signal the synchronizing signals;

a means for detecting said third synchronizing signal, including means for using the output signal of the fixed pulse pattern detecting means and means for regenerating said third synchronizing signal;

a means for deriving said fourth and fifth synchronizing signals including means for using the output signal of the fixed pulse pattern detecting means;

a plurality of hold circuits for producing wide width output pulse signals when the derived fourth and fifth synchronizing signals have a time interval less than a predetermined time interval, respectively;

a plurality of integrating circuits for integrating respective output pulse signals of said hold circuits and providing respective output signals;

a means for producing trigger pulses when the amplitude of the respective output signals of said integrating circuits exceeds predetermined values, respectively; and a means for generating signals synchronized with the respective transmission periods of said video and audio signals, including means for dividing the frequency of said regenerated third synchronizing signal including means for using the regenerated third synchronizing signal of the synchronizing signal regenerating means as a clock pulse and means for using the trigger pulses produced by said trigger pulse generating means as clear pulses.

6. A synchronizing signal regenerator for regenerating a first synchronizing signal including a pulse series having a predetermined certain repetition frequency being intermittently transmitted at a predetermined period for a predetermined certain duration, and a second synchronizing signal synchronized with boundaries of the pulse series of the first synchronizing signal and inserted in a repetition period for a period equal to the width of the pulse series intermittently inserted, from a composite signal including said first and second synchronizing signals, the regenerator comprising:

a means for detecting said second synchronizing signal and for regenerating said detected second synchronizing signal;

a means for detecting and deriving the pulse series of said first synchronizing signal;

a counter for counting the pulse series derived by the pulse series deriving means and for producing a logic "1" output signal when a predetermined number of pulses has been counted and being cleared by said regenerated second synchronizing signal;

a trigger pulse generator for producing a trigger pulse when said counter produces the "1" signal; and a means for generating a signal synchronized with said intermittently transmitted period of the pulse series of said first synchronizing signal, said generating means including a frequency dividing means for dividing the frequency of said regenerated second synchronizing signal obtained from the second synchronizing signal regenerating means including means for using the regenerated second synchronizing signal as a clock pulse and means for using the trigger pulse obtained from said trigger pulse generator as a clear pulse.

7. A synchronizing signal regenerator for receiving a composite signal including various information signals inserted at certain predetermined positions, in which $n$ information signals are divided in predetermined certain time units, and in which the 1st to $(n-2)$th information signals are arranged in a phase shift relationship in one time unit and at repetition period of each $(n-1)$ of said time units, the $(n-1)$th information signal is arranged with respect to the rest of the portion of the $(n-1)$ time units for a time corresponding to $(n-1) \times$ M times the units, wherein M is a positive integer, and the $n$th information signal is arranged in the rest of the portion at which the $(n-1)$th information signal is not arranged, and a first synchronizing signal synchronized with boundaries of the information signals and a plurality of second synchronizing signals for representing the transmission period of said various information signals and required for the regeneration of said information signals being pulse coded in a manner separately identifiable and inserted in a predetermined portion of said information signals, and for generating signals synchronized with the transmission period of said respective information signals, the regenerator comprising:

a means for detecting and regenerating the first synchronizing signal synchronized with the boundaries of the various information signals;

$n$ number of detecting means for detecting respective coded signals of the plurality of the second synchronizing signals, and for detecting signals for indicating the transmission periods of said 1st to $(n-2)$th information signals, a signal indicating the transmission period of a sum signal of the $(n-1)$th and nth information signals, and a signal indicating the transmission period of the $n$th information signal $n$ counters for counting the signals obtained from the $n$ means for detecting signals indicating the transmission periods respectively, and for producing a logic "1" output signal when a predetermined count number is reached and being cleared by the regenerated first synchronizing signal;

$n$ trigger pulse generators for generating respective trigger pulses when each of said $n$ counters produces an output signal;

$(n-1)$ step down circuits for frequency dividing the frequency of said regenerated first synchronizing signal into output signals of $1/(n-1)$ frequency, including means for using the first synchronizing signal regenerated by said first synchronizing signal regenerating means as a clock pulse, and means for using the trigger pulses generated by the trigger pulse generators as a clear pulse, each of said trigger pulses being synchronized with signals detected by the detecting means for detecting the signals for indicating the transmission periods of the 1st to $(n-2)$th information signals, and for indicating the transmission period of the sum signal of the $(n-1)$th and $n$th information signals, respectively;

a step down circuit for dividing the frequency of the regenerated first synchronizing signal into an output signal of $1/M(n-1)$ frequency, including means for using the regenerated first synchronizing signal as a clock pulse and means for using the trigger pulse generated by the trigger pulse generator synchronized with the signal detected by the synchronizing signal detecting means for indicating the transmission period of the $n$th information signal; and a means for obtaining a logic product of the output signal of the step down circuit synchronized with the transmission period of the sum signal of the (n—1)th and nth information signals among the step down circuits for dividing the input frequency into 1/(n—1), and an inverted signal of the output signal of said step down circuit for dividing the frequency of the regenerated first synchronizing signal into 1/M(n—1).

8. A synchronizing signal regenerator for receiving a composite signal including various information signals inserted at certain predetermined positions, in which n information signals are divided in predetermined certain time units, and in which the lst to (n—2)th information signals are arranged in a phase shift relationship in one time unit and at a repetition period of each (N—1) of said time units, the (n—1)th information signal is arranged with respect to the rest of the portion of the (n—1) time units for a time corresponding to (n—1) x M times the units, wherein M is a positive integer, and the nth information signal is arranged in the rest of the portion at which the (n—1)th information signal is not arranged, and a first synchronizing signal synchronized with boundaries of the information signals and a plurality of second synchronizing signals for representing the transmission periods of said various information signals and required for the regeneration of said information signals being pulse coded in a manner separately identifiable and inserted in a predetermined portion of said information signals, and for generating signals synchronized with the transmission periods of said respective information signals, the regenerator comprising:

a means for detecting said first synchronizing signal and for regenerating said first synchronizing signal synchronized with boundaries of said various information signals;

a first detecting means for detecting a signal indicating the transmission period of either the second synchronizing signal indicating the transmission period of said lst to (n—2)th information signals, or the second synchronizing signal for indicating the transmission period of the information signal which is a sum of the (n—1)th and nth information signals;

a second detecting means for detecting the second synchronizing signal for indicating the transmission period of said (n—1)th information signal;

first and second counters for counting the detected signals detected by the first and second detecting means, and for producing respective logic "1" signals when the count reaches a predetermined number, and being cleared by said regenerated first synchronizing signal;

first and second trigger pulse generators for producing respective trigger pulses when a logic "1" signal is produced from said first and second counters;

a ring counter for dividing the frequency of said regenerated first synchronizing signal in 1/(n—1) and for producing (n—1) output signals having phases different from each other by 2π/(n—1) radians, including means for using the first synchronizing signal regenerated by said first synchronizing signal regenerator as a clock pulse, and means for using the trigger pulse of said first trigger pulse generator as a clear pulse;

a step down circuit for dividing the frequency of said regenerated first synchronizing signal into an output signal of 1/M(n—1) frequency, including means for using said regenerated first synchronizing signal as a clock pulse, and means for using the trigger pulse of said second trigger pulse generator as a clear pulse; and a means for taking the logic product of an inverted output signal of said step down circuit, and a signal among the output signals of said ring counter and synchronized with the transmission period of the signal which is a sum of said (n—1)th information signal and said nth information signal.

9. A synchronizing signal regenerator for receiving a composite signal including various information signals inserted at certain predetermined positions, in which n information signals are divided in predetermined certain time units, and in which the lst to (n—2)th information signals are arranged in a phase shift relationship in one time unit and at a repetition period of each (n—1) of said time units, the (n—1)th information signal is arranged with respect to the rest of the portion of the (n—1) time units for a time corresponding to (n—1) x M times the units, wherein M is a positive integer, and the nth information signal is arranged in the rest of the portion at which the (n—1)th information signal is not arranged, and a first synchronizing signal synchronized with boundaries of the information signals and a plurality of second synchronizing signals for representing the transmission period of said various information signals and required for the regeneration of said information signals being pulse coded in a manner separately indentifiable and inserted in a predetermined portion of said information signals, and for generating signal synchronized with the transmission period of said respective information signals, the regenerator comprising:

a means for detecting said first synchronizing signal and for regenerating said first synchronizing signal synchronized with boundaries of said information signals;

a detecting means for detecting and deriving a synchronizing signal indicating the transmission period of the (n—1)th information signal among said second synchronizing signals;

a counter for counting the derived signal derived by said synchronizing signal deriving means for indicating said transmission period of the (n—1)th information signal, and for producing a logic "1" signal when the count number reaches a predetermined number and being cleared by said regenerated first synchronizing signal;

a trigger pulse generator for producing a trigger pulse when said counter produces the logic "1" output signal;

a ring counter for dividing the frequency of said regenerated first synchronizing signal into 1/(N—1) and for producing (n—1) output signals having phases 2π/(n—1) radians different from each other, including means for using said regenerated first synchronizing signal as a clock pulse, and means for using the trigger pulse of the trigger pulse generator as a clear pulse;

a step down circuit for dividing the frequency of said regenerated first synchronizing signal into an output signal of 1/M(n—1) frequency, including means for using said regenerated first synchronizing signal as a clock pulse and means for using the trigger pulse of the trigger pulse generator as a clear pulse; and a means for producing a logic product of an inverted signal of the output signal of said step down circuit and a signal synchronized the transmission period at a sum of the $(n-1)$th and $n$th information signals among the output signals of said ring counter.

10. A synchronizing signal regenerator for regenerating synchronizing signals synchronized with respective transmission periods of a video signal and an audio signal by receiving a composite signal including a video signal and an audio signal arranged in a predetermined sequence and for durations having a predetermined integral ratio, the composite signal further comprising pulse coded first and second synchronizing signals required for the regeneration of said video and audio signals, a pulse coded third synchronizing signal synchronized with at least the boundary of said video signal and audio signal and having a repetition period corresponding to an integral multiple of the repetition frequency of the transmission period of said video signal or said audio signal, pulse coded fourth and fifth synchronizing signals for indicating the transmission period of said video and audio signals and a further synchronizing signal having a fixed pulse pattern and including a predetermined number of pulses for detecting the insertion position of said synchronizing signals, wherein the synchronizing signals are inserted in the composite signal at a predetermined repetition period in a predetermined duration in the respective video and audio signals, the regenerator comprising:

a means for detecting said fixed pulse pattern of the further synchronizing signal and for deriving an output signal for gating out from the composite signal the synchronizing signals;

a means for detecting said third synchronizing signal including means for using the output signal of the fixed pulse pattern detecting means, and means for generating said third synchronizing signal a means for deriving said fourth and fifth synchronizing signals including means for using the output signal of the fixed pulse pattern detecting means;

a plurality of counters for counting the fourth and fifth synchronizing signals derived respectively and for producing respectively a logic "1" output signal when a predetermined number of pulses has been counted and being cleared by said regenerated third synchronizing signal;

a plurality of trigger pulse generators for producing respective trigger pulses when said counters produce the logic "1" output signal; and a means for generating signals synchronized with the respective transmission periods of said video and audio signals by dividing the frequency of said regenerated third synchronizing signal including means for using the generated third synchronizing signal of the third synchronizing signal regenerating means as a clock pulse and the trigger pulses produced by said trigger pulse generators as clear pulses.

* * * * *